United States Patent
Kohlmeier et al.

(10) Patent No.: US 11,934,426 B2
(45) Date of Patent: Mar. 19, 2024

(54) INTELLIGENTLY IDENTIFYING A USER'S RELATIONSHIP WITH A DOCUMENT

(71) Applicant: Microsoft Technology Licensing, LLC, Redmond, WA (US)

(72) Inventors: Bernhard Kohlmeier, Seattle, WA (US); Madeline Schuster Kleiner, Bellevue, WA (US); Jon Meling, Tromsø (NO); Jan Heier Johansen, Tromsø (NO); Vegar Skjaerven Wang, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/709,948

(22) Filed: Mar. 31, 2022

(65) Prior Publication Data
US 2022/0222279 A1    Jul. 14, 2022

Related U.S. Application Data

(63) Continuation of application No. 16/746,581, filed on Jan. 17, 2020, now Pat. No. 11,321,360.

(51) Int. Cl.
*G06F 16/28* (2019.01)
*G06F 16/93* (2019.01)
*G06N 20/00* (2019.01)

(52) U.S. Cl.
CPC ............ *G06F 16/285* (2019.01); *G06F 16/93* (2019.01); *G06N 20/00* (2019.01)

(58) Field of Classification Search
CPC ........ G06F 16/93; G06F 16/285; G06N 20/00
See application file for complete search history.

(56) References Cited

U.S. PATENT DOCUMENTS

| | | |
|---|---|---|
| 6,385,602 B1 | 5/2002 | Tso et al. |
| 7,853,610 B2 | 12/2010 | Hirsch et al. |
| 7,870,150 B2 | 1/2011 | Hirsch et al. |
| 8,108,779 B1 | 1/2012 | Rein et al. |
| 10,042,615 B2 | 8/2018 | Fredrickson et al. |
| 10,042,616 B2 | 8/2018 | Fredrickson et al. |
| 11,138,534 B1 | 10/2021 | Kuhn et al. |
| 11,328,116 B2 | 5/2022 | Meling et al. |
| 11,392,594 B2 | 7/2022 | Helvik et al. |

(Continued)

FOREIGN PATENT DOCUMENTS

WO    2018102235 A1    6/2018

OTHER PUBLICATIONS

"International Search Report & Written Opinion issued in PCT Application No. PCT/US22/023231", dated Jul. 1, 2022, 13 Pages.

(Continued)

*Primary Examiner* — Hau H Hoang
(74) *Attorney, Agent, or Firm* — NovoTechIP International PLLC

(57) ABSTRACT

A method and system for receiving data relating to one or more activities performed by a user on a document within a specific time period, the one or more activities being performed by using an application, analyzing the data to identify a category of user activity based at least on the type of activity performed on the document, and transmitting a signal to a device for storage in association with the document, the signal including the identified category.

20 Claims, 8 Drawing Sheets

(56) References Cited

U.S. PATENT DOCUMENTS

| | | | |
|---|---|---|---|
| 11,522,924 | B2 | 12/2022 | Wang et al. |
| 2005/0086255 | A1 | 4/2005 | Schran et al. |
| 2007/0088690 | A1 | 4/2007 | Wiggen et al. |
| 2007/0265994 | A1* | 11/2007 | Ueda .................. G06F 16/93 |
| 2008/0091656 | A1 | 4/2008 | Charnock et al. |
| 2008/0215616 | A1 | 9/2008 | Hirsch et al. |
| 2008/0281835 | A1 | 11/2008 | Hirsch et al. |
| 2011/0302113 | A1 | 12/2011 | Smith et al. |
| 2014/0033009 | A1 | 1/2014 | Rein et al. |
| 2016/0379129 | A1 | 12/2016 | Assem Aly Salama et al. |
| 2017/0357661 | A1 | 12/2017 | Hornkvist et al. |
| 2018/0025084 | A1 | 1/2018 | Conlan et al. |
| 2020/0067997 | A1 | 2/2020 | Hardee et al. |
| 2020/0097340 | A1 | 3/2020 | Balik et al. |
| 2020/0159862 | A1 | 5/2020 | Kleiner et al. |
| 2021/0365466 | A1 | 11/2021 | Kleiner et al. |
| 2022/0284031 | A1 | 9/2022 | Helvik et al. |
| 2022/0353307 | A1 | 11/2022 | Wang et al. |
| 2022/0405612 | A1 | 12/2022 | Kleiner et al. |
| 2023/0325395 | A1 | 10/2023 | Kleiner et al. |

OTHER PUBLICATIONS

"Notice of Allowance Issued in U.S. Appl. No. 17/243,285", dated Jul. 29, 2022, 7 Pages.
"Non-Final Office Action Issued in U.S. Appl. No. 17/827,324", dated Mar. 29, 2023, 13 Pages.
U.S. Appl. No. 17/827,324, filed May 27, 2022.
"Notice of Allowance Issued in U.S. Appl. No. 16/881,830", dated Mar. 15, 2023, 14 Pages.
U.S. Appl. No. 17/349,157, filed Jun. 16, 2021.
"Final Office Action Issued in U.S. Appl. No. 16/881,830", dated Nov. 17, 2022, 18 Pages.
"International Search Report and Written Opinion Issued in PCT Application No. PCT/US22/028881", dated Aug. 12, 2022, 11 Pages.
"Non Final Office Action Issued in U.S. Appl. No. 16/881,830", dated Apr. 26, 2022, 18 Pages.
"Non Final Office Action Issued in U.S. Appl. No. 17/243,285", dated Apr. 6, 2022, 7 Pages.
"Notice of Allowance Issued in U.S. Appl. No. 17/827,324", dated Jul. 26, 2023, 9 Pages.
U.S. Appl. No. 18/335,221, filed Jun. 15, 2023.
"Office Action Issued in European Patent Application No. 20830477.4", dated Sep. 18, 2023, 6 Pages.
"Office Action Issued in European Patent Application No. 21718692.3", dated Nov. 29, 2023, 5 Pages.
Communication pursuant to Article 94(3) received for European Application No. 21718692.3, dated Nov. 29, 2023, 5 Pages.
Non-Final Office Action dated Jan. 18, 2024, in U.S. Appl. No. 18/335,221, 14 pages.

* cited by examiner

| Session Start Time | User ID | User Activities | Session End Time |
|---|---|---|---|
| 2019-03-29 T 09:17:24.135Z | 3be14b38-121f-4c7a-85cf-cc5ee98f35e6 | 30002<br>106<br>30010 | 2019-03-29 T 09:23:35.115Z |

INTELLIGENTLY IDENTIFYING A USER'S RELATIONSHIP WITH A DOCUMENT

CROSS-REFERENCE TO A RELATED APPLICATION

This patent application claims the benefit of priority to U.S. application Ser. No. 16/746,581 entitled "Intelligently Identifying a User's Relationship with a Document," filed on Jan. 17, 2020, the entirety of which is incorporated herein by reference.

BACKGROUND

Content creation applications often provide numerous features for users to utilize while working on a document. During the active lifecycle of a document, multiple users may perform various functions with respect to the document. For example, a first user may create the document, a second user may add some content to the document, and a third user may edit the document. A fourth user may review the document and make very minor changes to the document. Currently, a signal indicating creation and/or editing actions performed on the document may be stored with the document, but this signal provides very limited information about the edits made to the document. As a result, if the fourth user in the above example, who may have just made one formatting change, saves the document, the signal may simply indicate that the document was last saved by the fourth user. This does not provide any information about the user's relationship with the document, as it does not differentiate between a user that makes minor edits and one who contributes extensively to the content.

Hence, there is a need for improved systems and methods of enhancing and utilizing the edit signal for a document.

SUMMARY

In one general aspect, the instant application describes a data processing system for identifying a category of user activity for operations performed on a document. The data processing system may comprise one or more processors and a memory in communication with the processors, where the memory comprises executable instructions that, when executed by the processors cause the data processing system to receiving data relating to one or more activities performed by a user on a document within a specific time period, the one or more activities being performed by using an application, analyzing the data to identify a category of user activity based at least on the type of activity performed on the document, and transmitting a signal to a device for storage in association with the document, the signal including the identified category.

In yet another general aspect, the instant application describes a method for identifying a category of user activity for operations performed on a document. The method may include receiving data relating to one or more activities performed by a user on the document within a specific time period, the one or more activities being performed by using an application, analyzing the data to identify a category of user activity based at least on the type of activity performed on the document, and transmitting a signal to a device for storage in association with the document, the signal including the identified category.

In a further general aspect, the instant application describes a non-transitory computer readable medium on which are stored instructions that when executed cause a programmable device to receive data relating to one or more activities performed by a user on a document within a specific time period, the one or more activities being performed by using an application, analyze the data to identify a category of user activity based at least on the type of activity performed on the document, and transmit a signal to a device for storage in association with the document, the signal including the identified category.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 depicts an example data structure for recording user activities within a session.

DETAILED DESCRIPTION

Figure 1:
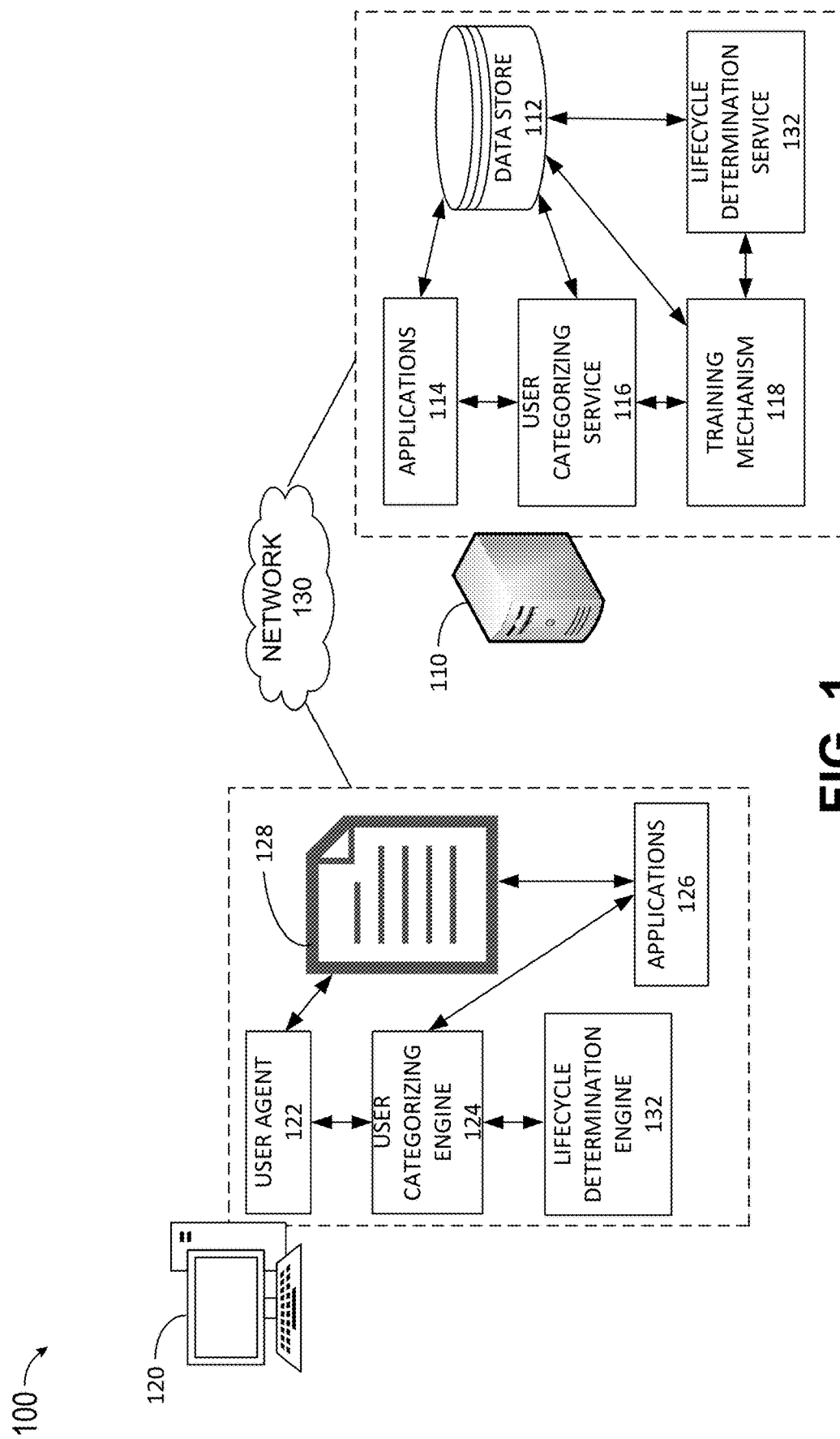
FIG. 1 illustrates an example system in which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

From creation to completion, a document may be touched by a plurality of users. These users may have different organizational roles and different relationships with the document at different times. For example, a first user may create and author the majority of the document, while a second user may have a collaborator role and as such may review and add to the content. A third user may review the document, provide comments, make formatting changes or make other minor edits; and a fourth user may simply operate as a reader of the document. Currently, there are no mechanisms for keeping track of a user's relationship with a document. At best, an edit signal for a document may identify the time at which the document was last saved and the person who saved it. This does not provide reliable information about the user's relationship with the document. Furthermore, because some applications offer an autosave feature that occasionally saves the document automatically, this edit signal may be stored every time an autosave occurs. This may lead to frequent transmission and/or storage of the edit signal which may negatively affect processor load and/or network bandwidth. Furthermore, because the autosave edit signal may be noisy and does not differentiate between minor edits and major changes, among other reasons, this edit signal may not provide accurate or useful information. For example, a reader who adds a period to the content and saves the document (or the document is saved via autosave) may be identified as a person who modified the document. As a result, the information provided with a document often has the technical problem of being limited in scope, noisy, unreliable and not very useful to its users. For example, users may not be able to accurately identify who has made modifications to the document and in what capacity without piling through the version history of the document, if available. Moreover, because of the frequent transmission and storage of the autosave edit signal, the processor load or network bandwidth may be negatively affected.

To address these technical problems and more, in an example, this description provides a technical solution for determining users' relationships with a document and storing that data in association with the document to provide additional information about the document. To do so, techniques may be used for collecting information about a user's activity in a document, analyzing the activities during a specific time period, identifying one or more categories to which the user may belong based on the user's activity, and transmitting this information for storage with the document. The information may be stored as metadata for the document, may be added as new properties to the document and may be displayed as information about the document to end users (e.g., when displaying properties of a file, for example, when displaying search results or on demand, such as a user selection or hover-over of a file).

As will be understood by persons of skill in the art upon reading this disclosure, benefits and advantages provided by such implementations can include, but are not limited to, a solution to the technical problems of unreliable and misleading modification information provided for documents based on limited edit signals that are collected only when a save occurs. Technical solutions and implementations provided herein optimize the process of collecting and reasoning over usage information about documents and as such provide more accurate and reliable information. The benefits provided by these solutions provide more user-friendly applications and enable users to increase their efficiency and their understanding of a document's history. Furthermore, because data relating to the user's activity may be sent at specific time periods (e.g., at the end of a session), the solutions may reduce processor load and/or network bandwidth usage.

As a general matter, the methods and systems described herein may include, or otherwise make use of, a machine-trained model to identify data related to a document. Machine learning (ML) generally includes various algorithms that a computer automatically builds and improves over time. The foundation of these algorithms is generally built on mathematics and statistics that can be employed to predict events, classify entities, diagnose problems, and model function approximations. As an example, a system can be trained using data generated by an ML model in order to identify patterns in user activity, determine associations between tasks and/or identify categories of use for a given user. Such training may be made following the accumulation, review, and/or analysis of user data from a large number of users over time, and which is configured to provide the ML algorithm (MLA) with an initial or ongoing training set. In addition, in some implementations, a user device can be configured to transmit data captured locally during use of relevant application(s) to a local or remote ML program and provide supplemental training data that can serve to fine-tune or increase the effectiveness of the MLA. The supplemental data can also be used to facilitate identification of content and/or to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

FIG. 1 illustrates an example system 100, in which aspects of this disclosure may be implemented. The system 100 may include a sever 110 which may be connected to or include a data store 112 which may function as a repository in which documents and/or data sets (e.g., training data for providing intelligent identification of a user categories with respect to a document) may be stored. The server 110 may operate as a shared resource server located at an enterprise accessible by various computer client devices such as client device 120. The server may also operate as a cloud-based server for offering global user categorizing services.

The server 110 may include and/or execute a user categorizing service 116 for providing intelligent categorization of users' roles with respect to a document. The user categorizing service 116 may operate to receive a usage signal from a document, determine based on the information provided in the usage signal one or more user categories for the user, and provide the identified user categories for storage in association with the document. As described further with respect to FIG. 3, the usage signal may include detailed information about the types of tasks performed on a document by a user within a given time period.

The server 100 may also include and/or execute a lifecycle determination service 130 for providing intelligent determination of a document's lifecycle stage. The lifecycle determination service 130 may receive information relating to the one or more user categories identified by the user categorizing service 116 and determine based on the identified user categories an appropriate lifecycle stage for the document.

One or more models of the user categorizing service 116 and/or the lifecycle determination service 130 may be trained by a training mechanism 118. The training mechanism 118 may use training data sets stored in the data store 112 to provide initial and ongoing training for each of the model(s). In one implementation, the training mechanism 118 may use labeled training data from the data store 112 to train each of the model(s) via deep neural network(s). The initial training may be performed in an offline stage.

The server 110 may also include or be connected to one or more online applications 114 that provide access to or enable creation and/or editing of one or more documents. Examples of suitable applications include, but are not limited to, a word processing application, a presentation application, a note taking application, a text editing application, an email application, a spreadsheet application, a desktop publishing application, a digital drawing application and a communications application.

A client device 120 may be connected to the server 110 via a network 130. The network 130 may be a wired or wireless network(s) or a combination of wired and wireless networks that connect one or more elements of the system 100. The client device 120 may be a personal or handheld computing device having or being connected to input/output elements that enable a user to interact with an electronic document 128 on the client device 120. Examples of suitable client devices 120 include but are not limited to personal computers, desktop computers, laptop computers, mobile telephones, smart phones, tablets, phablets, digital assistant devices, smart watches, wearable computers, gaming devices/computers, televisions, and the like. The internal hardware structure of a client device is discussed in greater detail in regard to FIGS. 6 and 7.

The client device 120 may include one or more applications 126. Each application 126 may be a computer program executed on the client device that configures the device to be responsive to user input to allow a user to interactively view, generate and/or edit the electronic document 128. The electronic document can be representative of any editable file (e.g., any file that stores content that can be edited by a user). Examples of electronic documents include but are not limited to word-processing documents, presentations, spreadsheets, notebooks, websites (e.g., SharePoint sites), digital drawings, emails, and the like. The electronic document may be stored locally on the client device 120, stored in the data store 112 or stored in a different data store and/or server.

The applications 126 may process the electronic document 128, in response to user input through an input device, to create, view and/or modify the content of the electronic document, by displaying or otherwise presenting display data, such as a graphical user interface (GUI) which includes the content of the electronic document 128, to the user. Examples of suitable applications include, but are not limited to, a word processing application, a presentation application, a note taking application, a text editing application, an email application, a spreadsheet application, a desktop publishing application, a digital drawing application and a communications application.

The client device 120 may also access applications 114 that are run on the server 110 and provided via an online service as described above. In one implementation, applications 114 may communicate via the network 130 with a user agent 122, such as a browser, executing on the client device 120. The user agent 122 may provide a user interface that allows the user to interact with application content and electronic documents stored in the data store 112 via the client device 120. In some examples, the user agent 122 may be a dedicated client application that provides a user interface and access to electronic documents stored in the data store 112.

In one implementation, the client device 120 may include a local user categorizing engine 124 for categorizing a user's roles with respect to documents, such as the electronic document 128. In an example, the local user categorizing engine 124 may operate with the applications 126 to provide these local user categorizing services. For example, when the client device 120 is offline, the local user categorizing engine may make use of one or more local repositories to provide categorization of user activity roles for a document. In one implementation, enterprise-based repositories that are cached locally may also be used to provide local user categorization. In an example, the client device 120 may also include a lifecycle determination engine 132 for determining the current lifecycle stage of a document such as the electronic document 128. The lifecycle determination engine 132 may use the amount and/or types of activity performed on the document within a given time period along with the identified user categories (e.g., received from the local user categorizing engine 124 and/or the user categorizing service 116) to determine which lifecycle stage the document is currently in.

It should be noted that the local user categorizing engine 124 and the user categorizing service 116 may receive usage signals from documents created or edited in a variety of different types of applications 126 or 114. Once usage signals are received, the local user categorizing engine 124 and/or the user categorizing service 116 may reason over the received usage signals regardless of the type of application they originate from to identify appropriate user categories.

Figure 2:
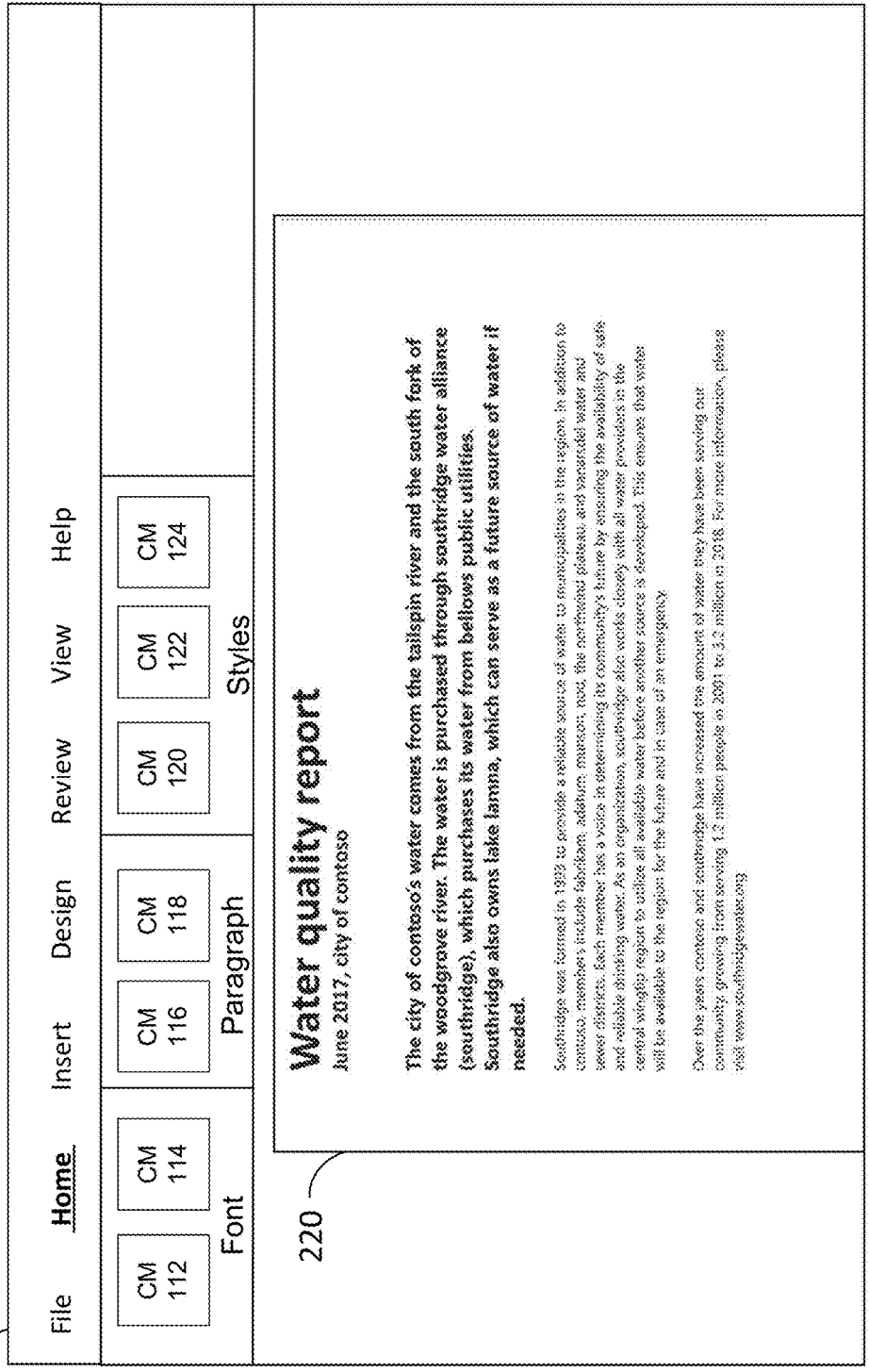
FIG. 2 illustrates an example graphical user interface (GUI) screen of an application that provides various options for creating and modifying a document.

FIG. 2 illustrates an example GUI screen 200 of an application that provides various options for creating and modifying a document. In the example provided in GUI screen 200, the user interface (UI) of a word processing application (e.g., Microsoft Word®) displays an example document. However, any other user interface for a document creation and editing application may be used. GUI screen 200 may include a toolbar menu 210 containing various menu options, each of which may provide one or more UI elements for performing various tasks with respect to the document. The toolbar menu 210 may include a list of selectable tabs, under each of which various application command options may be presented to the user. For example, the "Home" tab may present commands CM 112 and CM 114 for modifying the font, commands CM 116 and CM 118 for making a change to the paragraph (e.g., changing paragraph alignments, numbering items, changing paragraph indentations, and the like) and commands CM 120, CM 122 and CM 124 for displaying various style options for selections. Each of the additional tabs may provide a variety of other commands to choose from for creating or modifying the document. For example, users may choose commands to insert an item, leave a comment, or the change the layout of the document, among others. Each command in the application may have an associated toolbar command identifier (TCID) for identifying the command. Furthermore, user activities such as typing, scrolling, dwelling, or other tasks (i.e., non-command activities) that do not correspond to TCID commands may be logged separately.

GUI screen 200 may include a content pane 220 for displaying the content of the document. The content may be displayed to the user for authoring, editing, and/or reviewing purposes. For example, the user may utilize an input device (e.g., a keyboard) to insert input such as text into the content pane 220. Furthermore, the user may select one or more of the command options (e.g., commands CM 112, CM 114, CM 116, CM 118, CM 120, CM 122 or CM 124) provided by the application to modify the content of the document.

Content creation/editing applications often provide numerous commands for interacting with the document. For example, a word-processing application may include over 2,000 TCIDs. Each of the commands provided by an application may fall into a different category of user activity. For example, commands for changing the font, paragraph, or style of the document may be associated with formatting activities, while inserting comments, replying to comments and/or inserting text using a feature that enables tracking the changes made may correspond with reviewing activities. As a result, data representing commands used by the user to interact with the document may be collected and analyzed to determine a user category with respect to the document. This may be achieved by grouping the granular commands and non-command activities provided by an application into various user categories and then using the categories to identify one or more attributes (e.g., usage roles) for each user at a certain time.

In one implementation, categorizing the various commands and non-command activities into multiple user categories may be achieved manually by creating multiple categories of potential user activities and then analyzing each command activity, non-command activity or lack of activity within a specific time period to determine which category it is most closely associated with. For example, an initial set of user categories may include creators, authors, moderators, reviewers, and readers.

The creators category may include a user who initially created the document. In some implementations, the creator is the user who first saved the document as a file. In one implementation, this may include a user who utilizes a save-as option to save the document under a different name. Alternatively or additionally, when a document is saved under a new name, information about the original creator is stored with the document. For example, in one implementation, more than one user may be identified as a creator, such that both the original creator and the user who performed a save-as operation may be categorized as creators.

The authors category may include users who insert content into the document. For example, writers who use an input/output device to insert text in the content pane 220 of the screen 200 may be considered authors. Furthermore, users who paste content from another document into the content pane may also be considered authors. In one implementation, to be considered an author, the user may be required to insert more than a minimal or threshold number of characters and/or items in the content. For example, adding a few words or punctuation marks to a sentence in a multiple page document may not be considered authoring. In another example, adding one or two words to a slide (e.g., in a presentation document) may not be considered authoring, while adding a slide would be. The authors category may be associated with commands such as inserting a hyperlink, inserting a caption, adding a new slide, or inserting a table, a chart, or a formula.

The moderators category may include users who primarily perform editing functions such as changing the format of the document (e.g., changing font, style), adding or removing punctuation marks, changing sentence structure and/or making one- or two-word modifications. These users may be those who do not insert substantial content into the document but instead make modifications to the content already available in the document (e.g., change the ordering of chapters, change the layout of slides, and the like). This category may be associated with font (e.g., bold, italic, grow font size, background color, font color), paragraph and style related commands, among others. For example, the moderators category may correspond to commands CM 112, CM 114, CM 116, CM 118, CM 120, CM 122 and CM 124 of screen 200.

The reviewers category may include users who primarily provide comments, respond to comments, or make changes to the main body of the content by using reviewing tools such as track changes. For example, the reviewers' category may be associated with commands such as inserting new comments, turning track-changes on, inking, editing a comment, and replying to a comment. These commands may correspond with menu options that are presented under the selectable tab "Review" in the toolbar menu 210.

The readers category may include users that do not contribute to the content of the document, perform editing functions or provide comments, but instead view the content. This group of users may be distinguished from those who simply open a document without interacting with it. That is, readers may be those who actively consume the content to some degree. The readers category may be associated with actions such as scrolling through the pages of the document, selecting a portion of the document, or highlighting a portion of the document.

Other categories may also be created. For example, a category may be generated for text formatters. Another may be created for object formatters (e.g., shading, cropping, picture styles). Yet another category may be created for openers, which may include users who merely open and close a document or open a document but do not perform any substantial activities, such as scrolling. In one implementation, the categories may be enterprise specific. For example, an enterprise may be able to choose a set of categories that frequently apply to its documents. In such a case, user feedback may be collected to identify which commands and user activities correspond with each category. Categories may also be machine learned, as discussed herein.

Once an initial set of categories is generated, a select group of one or more users may operate to review the commands (e.g., TCIDs) provided by an application and assign each command and/or non-command activity to one or more categories. Alternatively or additionally, the process of creating categories and/or assigning each command and non-command activity to a category may involve utilizing one or more ML models. For example, explicit user feedback may be collected after the user has performed one or more tasks (e.g., commands) to request that the user identify their category with respect to the document and/or select from a set of presented categories. This may involve displaying a UI element to the user which requests that the user choose from a set of categories that identify the type of operation they performed on the document (e.g., choose from authoring, moderating, reviewing, reading). Furthermore, the UI element may enable the user to input a new category if the operation they performed does not fit into any of the optional categories provided. In this manner, one or more additional categories may be generated if identified by a group of users. Furthermore, commands may be associated with the available categories based on a user's identification of their category and their command history.

Once initial ML models have been trained and/or the command and non-command activities in an application are otherwise categorized, information about the user's activities may be collected and analyzed to identify one or more categories for the user with respect to each document they interact with (e.g., each document they open). For example, if the user opens the document depicted in screen 200 and then goes on to type the heading "Water quality report" before selecting a heading style from the list of style commands available in the toolbar menu 210, each of the user's activities and commands (e.g., typing text and choosing a style command) may be tracked and/or stored (e.g., temporarily) in a local data structure associated with the document to keep track of the user's activity and command history. This may involve storing the user IDs and document ID along with the list of TCIDs utilized by the user within a given time period.

FIG. 3 depicts an example data structure 300, such as a database table, for keeping track of user activity within a session. For example, data structure 300 may include a session start time. The session start time may be marked as the time the user opens a document and/or the time the user returns to an open document after an idle period. The session end time, on the other hand, may be marked as the time the document is closed or the time the last user activity occurs before document becomes idle. In between the session start time and the session end time, the data structure 300 may be used to keep track of user activities by recording the TCIDs associated with each separate user activity. Furthermore, in order to identify the user who performs the activities, the data structure 300 may store the user ID of the person interacting with the document. Once a determination is made that a session end time has been reached, the information collected during the session may be transmitted as part of a usage signal to the user categorizing service or engine for identifying one or more categories for the user for the corresponding session. The usage signal may be a high-fidelity signal which includes detailed information about the types of tasks performed on the document within a given time period.

To reduce load, the usage signal may be transmitted per session or on another periodic basis. In order to determine whether a session is an active (e.g., the session does not include idle time where a user stops interacting with a document for an extended period of time), the application may keep track of the amount of time passed between user activities. For example, if there has been no user activity in an open document for a given time period (e.g., 10 minutes), the application may determine that an active session has ended. This may result in the application identifying the time at which the last user activity occurred as the session end time.

In some implementations, user activity information may be tracked and transmitted for predetermined time periods. For example, if an active user session exceeds a specific threshold time period (e.g., 4 hours), the user activity information may be transmitted. In an alternative implementation, user activity information may be transmitted based on a predetermined schedule (e.g., once an hour). Other configurations are also contemplated.

In one implementation, in addition to keeping track of user activities, the application may also identify if there is a selected mode within which the user operated during the session, out of various modes of operation. For example, a word-processing application may include different modes for editing, reviewing and viewing a document. These modes may be selected by the user when they open a document or after they begin interacting with the document. In instances where a mode is selected by the user, the selected mode may provide an indication as to the user's intent with respect to the document. As such, this information may also be collected and transmitted as part of the usage signal for identifying the user category with respect to the document. In one implementation, these user-selected modes can also be provided as labeled training data for the ML model(s).

Once a determination is made that the usage signal containing the user activity information should be transmitted (e.g., upon a document closure or end of a session), the usage signal may be sent to the user categorizing service for processing. The categorizing service may analyze the user activity and perform an intelligent grouping of the activity to identify categories to which the user's activity may belong. The categorizing may be done based on the number of user activities and the categories to which they belong. In one implementation, if the user performs a sufficient number of activities for two or more categories, two or more user categories may be identified for the user for the same session. For example, a user that performs multiple reviewing activities (e.g., inserting a new comment, making an edit using track-changes, editing a comment) but also performs a plurality of moderating activities (e.g., changing the font, changing the style, changing the order of chapters), may be identified as both a reviewer and a moderator. The determination may be made based on the number and/or portion (e.g., percentage) of user activities associated with each category. For example, if a significant majority of the user's activities falls in one category, the second category may be ignored (e.g., 95% of activities relate to reading, but the user also added a period to the body of the content). The determination may also depend on the most prominent user category. For example, if the majority of the user's activities relate to authoring, but the user also performs moderator activities such as changing the font and paragraph numbering, the moderative activities are likely part of the process of authoring (e.g., the author often also edits the document) and as such may be overlooked. Identification of the most relevant user categories may be made by utilizing an ML model that can intelligently identify the most relevant categories for each user session. In addition to analyzing the user activities during a corresponding session, other information may also be used by the ML model(s) to determine the most appropriate category. In one implementation, this may involve utilizing user history. For example, if a user often has a moderator role with respect to documents that are similar to the current document (e.g., same or substantially similar subject matter, style, history, or group of collaborators), that information may be used as a parameter in determining or predicting the correct category.

In addition to utilizing the user's history, history data from other users may also be employed. For example, the ML model(s) may use data for users that are similar to the current user. In an example, the model may use history data from users with similar activities, similar work functions and/or similar work products. The data consulted may be global or local to the current device. Using ML models that are offered as part of a service may ensure that the definition of the categories can be modified iteratively and efficiently, as needed, to continually train the models. However, a local categorizing engine may also be provided.

Once the categorization operation is complete, the service and/or local engine may send the results as a user category signal to a storage medium for storage. This may involve sending the user category signal back to the client device (or any other device on which the document is stored) via the network. In one implementation, the user category signal may include the user category, the document ID, user ID, and/or activity date and time. The user category may be the category identified as being associated with the user activity. These may include one or more of author, reviewer, moderator, and reader. In some implementations, where there is more than one category identified, the category type may be a multi valued property. The document ID may be a file identifier that can identify the document with which the user activity is associated. This may enable the user category signal information to be attached to the file. In one implementation, the user category signal information is stored as metadata for the file. The user ID may identify the user who performed the user activities during the session. This may enable the system to properly attribute the identified category of operations to the identified user.

In one implementation, once the user category signal is available, it may be sent to the lifecycle determination service and/or the local lifecycle determination engine for determining the document's current lifecycle stage. In addition to the user category signal, the lifecycle determination service and/or the local lifecycle determination engine may receive data relating to the types and numbers of activities performed in the document within a given time period (e.g., the last active session or the last few active sessions). The lifecycle determination service and/or the local lifecycle determination engine may use the activity data to determine a level of activity for the document. This may be done by examining the number of activities (e.g., command and non-command tasks) within a given period and determining whether the number falls withing predetermined levels of activity (e.g., non-active, low activity, active, very active, extremely active).

To determine the level of activity, in addition to the number of activities performed, the types of activities may also be taken into consideration. This is because some activities may be more important than others within the context of the application. For example, in a word-processing application, pressing the delete button multiple times to delete a sentence may result in a larger number of activities than pasting a paragraph into the document. However, pasting the paragraph may be more important than deleting a sentence. To address this, different weights may be assigned to each activity in an application. The weights may be predetermined or may be set by one or more ML models used to identify the importance of each activity within the application. Once the weights are determined, the lifecycle determination service and/or the local lifecycle determination engine may calculate a weighted sum of the activities. The weighted sum may then be compared to predetermined activity levels (e.g., non-active, low activity, active, very active, extremely active) to determine which activity level the weighted sum falls into.

In addition to the activity level, the lifecycle determination service and/or the local lifecycle determination engine may also determine a lifecycle stage for the document. This may involve examining the user category included in the user category signal to determine a lifecycle stage the user category corresponds with. In an example, the lifecycle stages of the document may correspond with the user categories and may include creation, authoring, editing, reviewing, and reading, among others. For example, when the user signal indicates that the identified user category is the reviewer, the lifecycle stage may be identified as the reviewing stage. In one implementation, the activity level of the document may be taken into account when determining the lifecycle stage. For example, if a correspondence between activity levels and the stages of the documents has been shown (e.g., the editing stage corresponds with high activity), the activity level may be considered to better identify the lifecycle stage.

When two or more user categories are identified, the lifecycle determination service and/or the local lifecycle determination engine may examine additional data to determine the most appropriate lifecycle stage. For example, a user category history and/or lifecycle stage history of the document may be examined to determine the appropriate lifecycle stage. In one implementation, the lifecycle determination service and/or the local lifecycle determination engine may make use of one or more ML models to identify the appropriate lifecycle stage.

Once the user category signal, the activity level and/or the lifecycle stage is sent to the storage medium, they may be stored, e.g., in a folder such as a signals folder for further use. In an example, new properties for the document may be stored (e.g., in a folder associated with the document or the signals folder) based on the user category signal, the activity level and/or the lifecycle stage. The properties may be configured for propagation to secondary documents, in whole or in part. In this manner, a copy made of the document may inherit some or all of the properties of the original document. Once the properties are written to or associated with the document, they may be used in a variety of manners to improve user-experience.

Figure 4A:
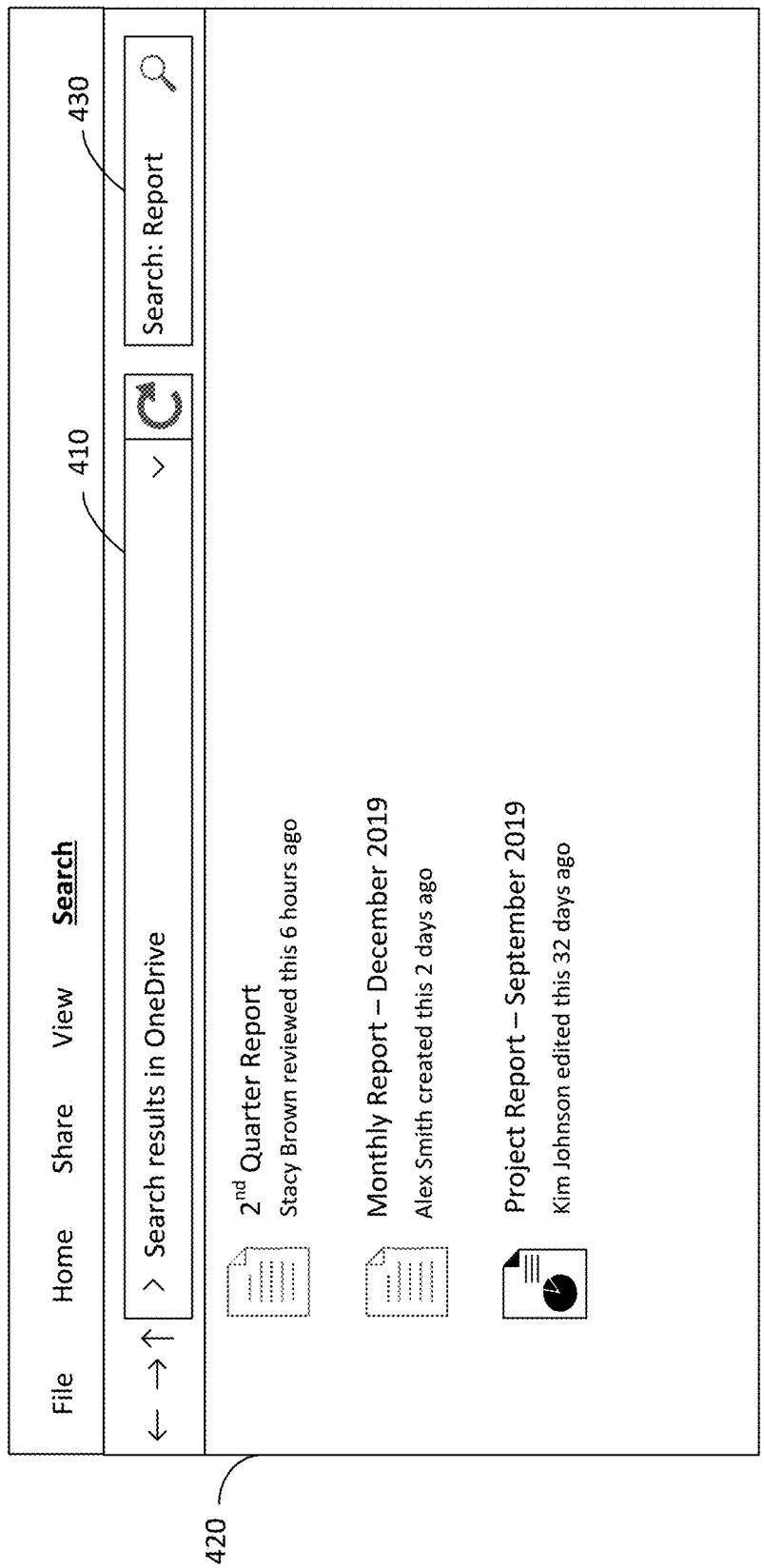
FIGS. 4A-4B are example GUI screens for displaying information about users' relationships with a document to provide an improved user-experience.
Figure 4B:
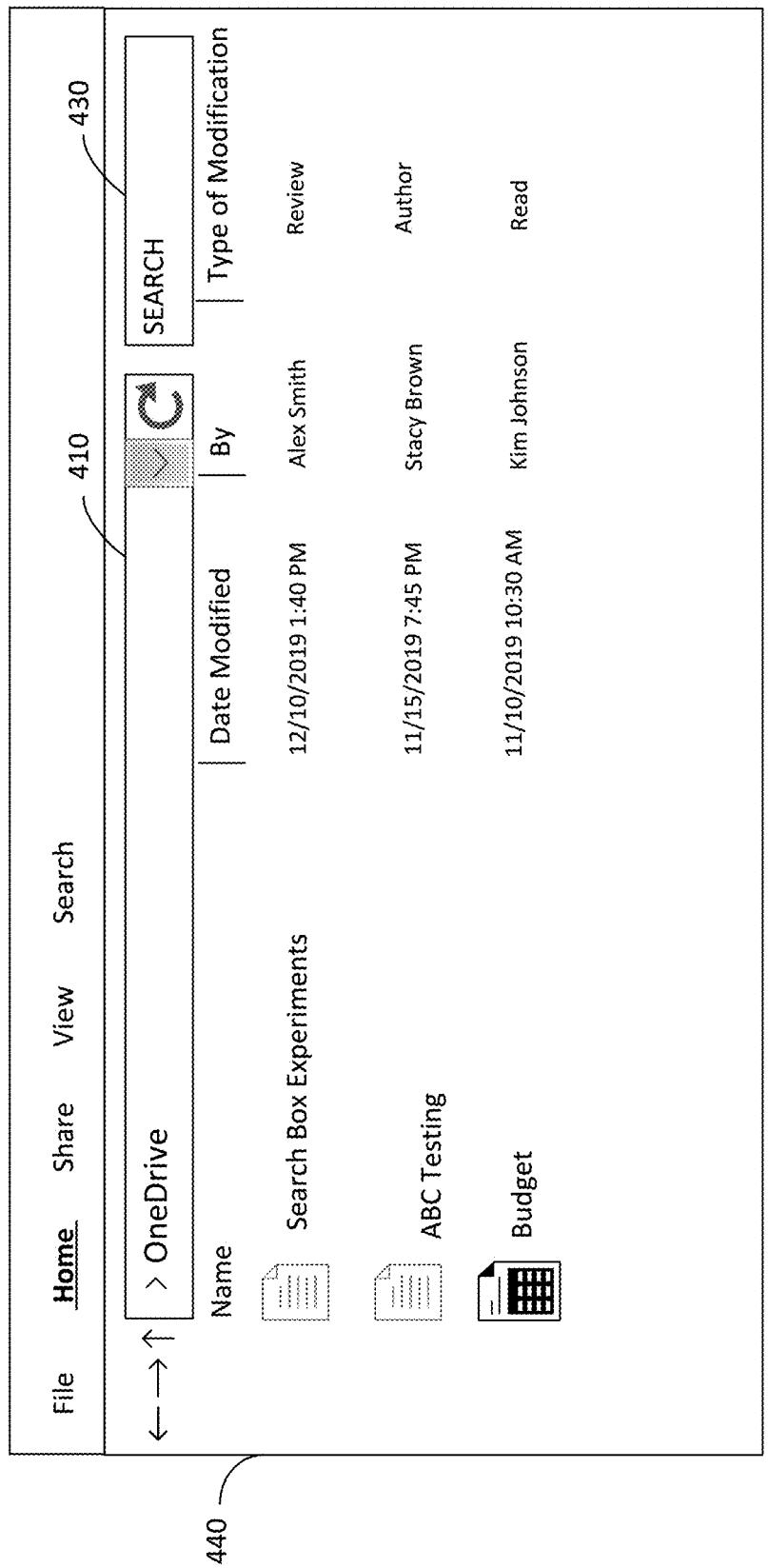

FIGS. 4A-4B illustrate example GUI screens for displaying users' relationships with a document to provide an improved user-experience. In one implementation, information about the category of operation performed on the document the last time the document was modified may be used to inform the user of the latest changes to the document. This may be used in an example in which document search results are presented to the user. FIG. 4A depicts an example GUI screen 400A for displaying search results. In an implementation, the GUI screen 400A may represent a UI element for accessing documents stored in a local and/or remote storage medium. The GUI screen 400A may include a dropdown or selection box 410 for displaying the location of the file folder displayed in the display area 420 and an input box 430 for entering one or more search terms.

Once a search term is entered into the input box 430 and a search is initiated, a mechanism may be employed to search for the entered keyword in the location identified in the dropdown box 410. After one or more search results are identified, they may be displayed in the display area 420. In one implementation, the search results may include an indication (e.g., icon) for the type of file located, along with the name of the file. Furthermore, the user category information from the file properties may be used to provide relevant and current information to the user about the latest status of the identified files. Thus, information may be provided about the user who last modified or used the document, as well as the type of activity the user performed on the document. For example, when the keyword "report" is used to search for documents in the "OneDrive" folder and three search results are identified, information may be provided about the type of operation the last user performed on each of the identified search results.

In this manner, the technical solution may provide a significant advantage over currently used mechanisms of providing information about documents identified as part of a search. Currently, most applications that offer search results simply identify the date of the last modification. However, because they cannot determine the type of activities the user performed on the document, they cannot differentiate between a user that made significant changes to the document and one that simply corrected a typo while reading the document. In both instances, the user may be identified as the last modifier of the document. This may be misleading and inaccurate, as the reader did not make any significant modifications to the document. By identifying the type of category of operation the last user performed on the document, more accurate and relevant information may be provided with search results. In an example, in addition to the last user and the type of operation they performed, the time the last operation was performed may be displayed with respect to the current time (e.g., a certain number of hours, days, or months ago). This may provide a more user-friendly frame of reference than simply including the time and date. For example, by stating that the document was last reviewed by Stacy Brown 6 hours ago (instead of providing the time and date it was reviewed), the user can readily see how recent Stacy's activities were. Alternatively or additionally, the actual time and date may be displayed, such as based on user preference.

FIG. 4B depicts an example GUI screen 400B for navigating and displaying a list of files in a folder. In an implementation, the GUI screen 400B may represent a UI element for accessing files stored in a local and/or remote storage medium. Similar to the GUI screen 400A of FIG. 4A, GUI screen 400B may include a dropdown box 410 for displaying the location of the file folder displayed in the display area 440 and an input box 430 for entering one or more search terms. The display area 440 of the GUI screen 400B may provide a list of files stored in the folder location identified in the dropdown box 410. In one implementation, when providing the list of files, the file properties may be utilized to provide more relevant information about each of the files. In an example, in addition to the name of each file and the date the file was last modified, information about the user and the type of modification they made to the document is displayed. For example, for the file named "Search Box Experiments," the display area 440 may also inform the user that the file was last reviewed by the user named "Alex Smith" on Dec. 10, 2019. This may provide more relevant and accurate insights about the document and its history. The user may filter the list of files by entering one or more search terms in the input box 430, such as described in reference to FIG. 4A.

When the last user fits into more than one category of user activity, two or more categories may be displayed for the type of modification performed on the document. In one implementation, the files displayed in the display area 440 may be sorted by the type of modification made. This may help the user quickly identify which files were last modified, which ones were reviewed and the like. Furthermore, the GUI screen 400B may enable the user to sort the files by the user name to see each user's latest activities with respect to the files in the folder. In another implementation, an option may be provided to allow a user to select which user categories are displayed. For example, the user may choose to hide documents for which the latest activity was a read. In another example, the user may select to only view documents that were recently created or authored.

In one implementation, data relating to the level of activity and/or the lifecycle stage of the document may also be displayed in association with the document when information about the document is displayed. For example, in each of the GUI screens 400A and 400B, information about the level of activity and/or the lifecycle stage of the document may be displayed for the documents listed. In one implementation, the level of activity and/or the lifecycle stage of the document may be provided as an option for the user to choose to view when a list of one or more documents is displayed.

Figure 5:
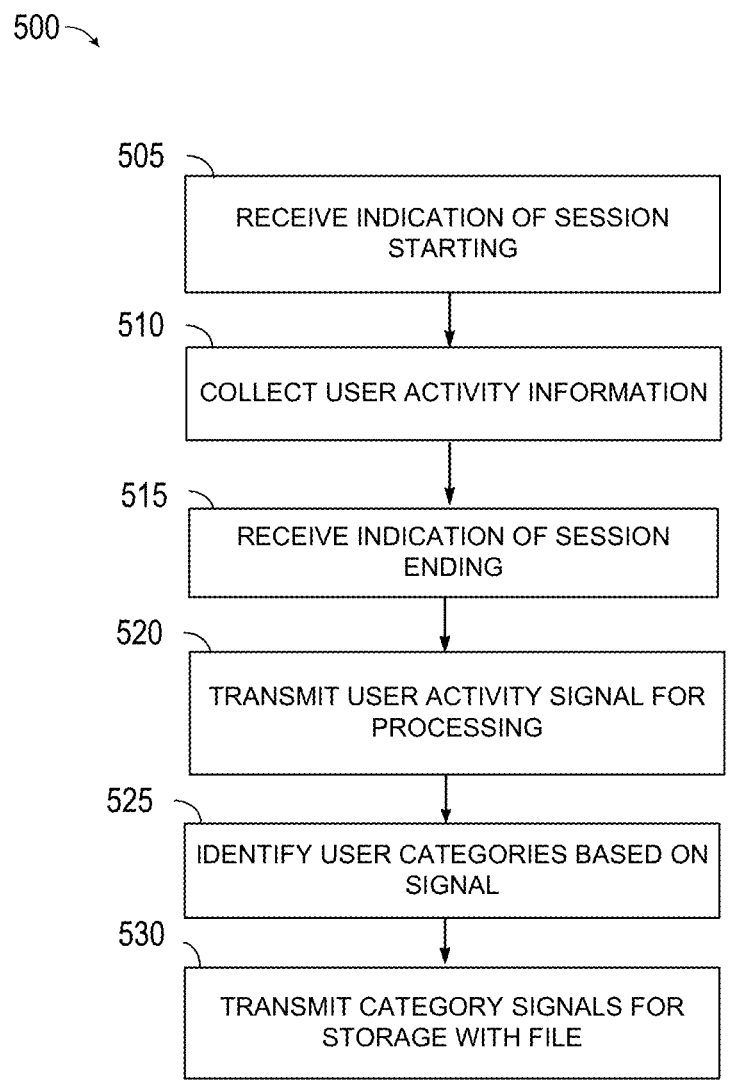
FIG. 5 is a flow diagram depicting an exemplary method for categorizing user activities performed on a document and providing the categorization information to improve user experience.

FIG. 5 is a flow diagram depicting an exemplary method 500 for categorizing user activities performed on a document and providing the categorization information to improve user experience. The method 500 may be performed by an application utilized to modify the document and/or a service or local engine used to categorize user activity. At 505, the method 500 may begin by receiving an indication that a session has started. This may occur, for example, when a document is first opened or when a user begins actively utilizing a document after an idle period.

After receiving the indication, method 500 may proceed to collect the user's command and task history, at 510. This may be achieved by collecting and storing the user's commands and tasks as long as the session continues. Alternatively, the command and task history may be collected and sent for specific time periods. This information may be stored locally and/or remotely. Once an indication is received, at 515, that the session has ended, the application may transmit the user activity information along with other relevant information (e.g., user ID, document ID, session end time, a time at which each user activity was performed, and/or a selected document mode) to a categorization service or local categorization engine, at 520.

The information may be sent as data as part of a usage signal. Once received at the service or local engine, the information may be used to identify one or more user categories for the activities performed during the session, at 525. This may be achieved by utilizing one or more ML models that analyze the information received along with other information (e.g., user history information) to identify one or more appropriate categories of user activities that identify the relationship between the user and the document for the corresponding session. The identified categories may then be transmitted as user category signals to a storage medium for storage in a location associated with the document. In one implementation, the user category signal may be stored as metadata associated with the document. The properties stored as metadata may include the identified categories (e.g., author, creator, reviewer), the user ID and the session end time. This information may then be used in a variety of methods and systems to improve user experience when interacting with documents.

It should be noted that the ML model(s) categorizing the user activities may be hosted locally on the client or remotely, e.g., in the cloud. In one implementation, some ML models are hosted locally, while others are stored remotely. This enables the client to provide some categorization even when the client is not connected to a network. It should also be noted that in collecting and storing user history data and user feedback, care must be taken to comply with all privacy guidelines and regulations. For example, user feedback may be collected in such a way that it does include any user identifying information. Furthermore, an option may be provided to seek consent from users for collection and use of user data or to enable users to opt-out of data collection.

Thus, the technical solution may provide methods and systems for collecting information about user activity within a document and may use that information to categorize the user's relationship with the document for a given time period. This information may then be stored with a document and used to provide detailed information about the most recent use(s) of the document and categories of operations performed on the document. This can improve the user's overall experience, increase their efficiency, and knowledge, and assist them in getting a better overall picture of document history.

Figure 6:
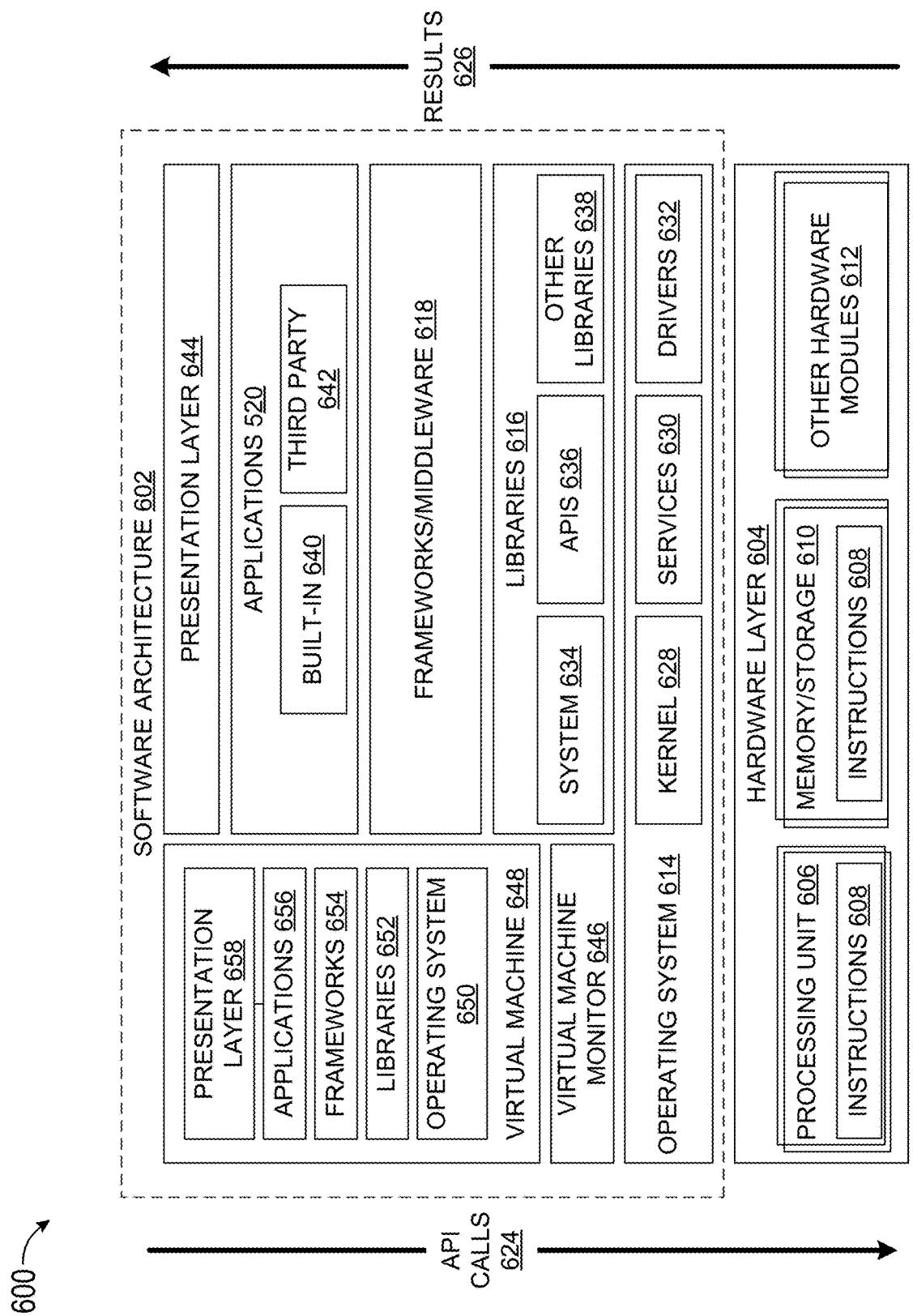
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
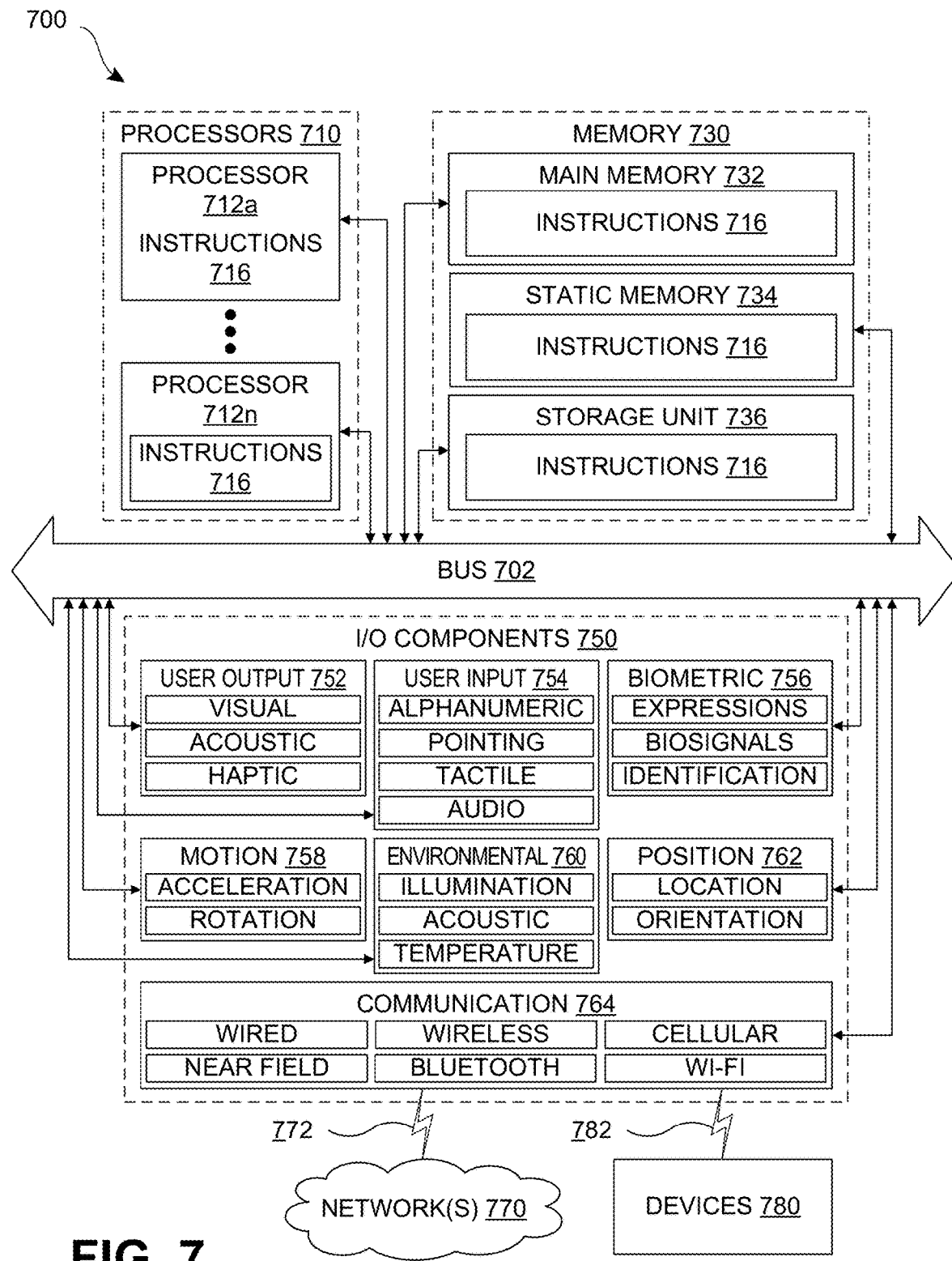
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory storing executable instructions that, when executed by the processor, cause the data processing system to perform functions of:
receiving data relating to one or more activities performed by a user on a document within a specific time period, the one or more activities being performed by using an application;
analyzing the data to identify a category of user activity based at least on the type of activity performed on the document; and
transmitting a signal to a device for storage in association with the document, the signal including the identified category.

Item 2. The data processing system of item 1, wherein the category of user activity includes at least one of authoring, reviewing, moderating, reading and editing.

Item 3. The data processing system of items 1 or 2, wherein the data includes at least one of a list of user activities performed on the document during the specific time period, a user identifier, a document identifier, an application mode, and a time at which the specific time period ended, Item 4. The data processing system of any of the preceding items, wherein the specific time period is a session of the application.

Item 5. The data processing system of item 4, wherein the session begins when the document is first opened or when the user begins interacting with the document after an idle period.

Item 6. The data processing system of any of the preceding items, wherein analyzing the data to identify a category of user activity is performed by one or more machine learning models.

Item 7. The data processing system of item 6, wherein at least one of the one or more machine-learning models is trained by using a training data set that includes user feedback.

Item 8. A method for identifying a category of user activity for operations performed on a document comprising:
receiving data relating to one or more activities performed by a user on the document within a specific time period, the one or more activities being performed by using an application;
analyzing the data to identify a category of user activity based at least on the type of activity performed on the document; and
transmitting a signal to a device for storage in association with the document, the signal including the identified category.

Item 9. The method of item 8, wherein the data is received from the application.

Item 10. The method of item 9, wherein the application collects information about the one or more activities during the specific time period.

Item 11. The method of any of items 8-10, wherein the signal includes a user identifier, a document identifier and a time at which the identified category was performed on the document.

Item 12. The method of any of items 8-11, wherein information provided by the signal is used to display the identified category when presenting information about the document.

Item 13. The method of item 12, wherein the information is displayed when presenting a list of files available in a file folder or when presenting a list of search results.

Item 14. The method of any of items 8-13, wherein the data includes at least one of a list of user activities performed on the document during the specific time period, a user identifier, a document identifier, and an application mode, and a time at which the specific time period ended.

Item 15. A non-transitory computer readable medium on which are stored instructions that when executed cause a programmable device to:
receive data relating to one or more activities performed by a user on a document within a specific time period, the one or more activities being performed by using an application;
analyze the data to identify a category of user activity based at least on the type of activity performed on the document; and
transmit a signal to a device for storage in association with the document, the signal including the identified category.

Item 16. The non-transitory computer readable medium of item 15, wherein information provided by the signal is used to display the identified category when presenting information about the document.

Item 17. The non-transitory computer readable medium of item 16, wherein the information is displayed when presenting a list of files available in a file folder or when presenting a list of search results.

Item 18. The non-transitory computer readable medium of any of items 15-17, wherein the category of user activity includes at least one of authoring, reviewing, moderating, reading and editing.

Item 19. The non-transitory computer readable medium of any of items 15-18, wherein analyzing the data to identify a category of user activity is performed by one or more machine learning models.

Item 20. The non-transitory computer readable medium of item 19, wherein at least one of the one or more models is trained by using a training data set that includes user feedback.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
receiving data relating to one or more activities performed by a user on a document within a given time period, the one or more activities being performed by using an application;

automatically processing the data to identify a category of user activity for the document based at least on a type of activity performed on the document;

identifying a lifecycle stage for the document based on at least the identified category of user activity; and providing a signal for storage in association with the document, the signal including the identified lifecycle stage.

2. The data processing system of claim 1, wherein the lifecycle stage includes at least one of creation, authoring, reviewing, reading and editing.

3. The data processing system of claim 1, wherein the data includes at least one of a list of user activities performed on the document during the given time period, a user identifier, a document identifier, an application mode, and a time at which the given time period ended.

4. The data processing system of claim 1, wherein the lifecycle stage is identified based on the identified category of user activity and at least one of a user category history of the document or a lifecycle stage history of the document.

5. The data processing system of claim 1, wherein identifying the lifecycle stage for the document is done by using one or more machine-learning (ML) models.

6. The data processing system of claim 1, wherein the executable instructions when executed by the processor, further cause the data processing system to perform functions of:

identifying a level of activity for the document based on at least one of a number of activities performed on the document during the given time period and the type of activity performed on the document, wherein the signal for storage includes the identified level of activity.

7. The data processing system of claim 6, wherein the lifecycle stage is identified based on the identified category of user activity and the identified level of activity.

8. The data processing system of claim 6, wherein the level of activity includes at least one of non-active, low activity, active, very active, and extremely active.

9. The data processing system of claim 1, wherein the executable instructions when executed by the processor, further cause the data processing system to perform functions of providing the identified lifecycle stage for display in association with the document, when information about the document is presented.

10. A method for identifying a lifecycle stage for a document comprising:

receiving data relating to one or more activities performed by a user on a document within a specific time period, the one or more activities being performed by using an application;

automatically processing the data to identify a category of user activity for the document based at least on a type of activity performed on the document;

identifying a lifecycle stage for the document based on at least the identified category of user activity;

providing a signal for storage in association with the document, the signal including the identified lifecycle stage; and providing a signal for storage in association with the document, the signal including the identified lifecycle stage.

11. The method of claim 10, wherein the lifecycle stage includes at least one of creation, authoring, reviewing, reading and editing.

12. The method of claim 10, wherein the lifecycle stage is identified based on the identified category of user activity and at least one of a user category history of the document or a lifecycle stage history of the document.

13. The method of claim 10, wherein identifying the lifecycle stage for the document is done by using one or more machine-learning (ML) models.

14. The method of claim 10, further comprising:

identifying a level of activity for the document based on at least one of a number of activities performed on the document during the specific time period and the type of activity performed on the document, wherein the signal for storage includes the identified level of activity.

15. The method of claim 14, wherein the lifecycle stage is identified based on the identified category of user activity and the identified level of activity.

16. The method of claim 14, wherein the level of activity includes at least one of non-active, low activity, active, very active, and extremely active.

17. The method of claim 10, providing the identified lifecycle stage for display in association with the document, when information about the document is presented.

18. A non-transitory computer readable medium on which are stored instructions that when executed cause a programmable device to perform functions of:

receiving data relating to one or more activities performed by a user on a document within a given time period, the one or more activities being performed by using an application;

automatically processing the data to identify a category of user activity for the document based at least on a type of activity performed on the document;

identifying a lifecycle stage for the document based on at least the identified category of user activity; and providing a signal for storage in association with the document, the signal including the identified lifecycle stage.

19. The non-transitory computer readable medium of claim 18, wherein the instructions when executed cause a programmable device to further perform functions of:

identifying a level of activity for the document based on at least one of a number of activities performed on the document during the given time period and the type of activity performed on the document, and wherein the signal for storage includes the identified level of activity.

20. The non-transitory computer readable medium of claim 18, wherein a model for identifying the category of user activity or identifying the lifecycle stage is trained by using a training data set that includes user feedback.

* * * * *